Patented Mar. 6, 1951

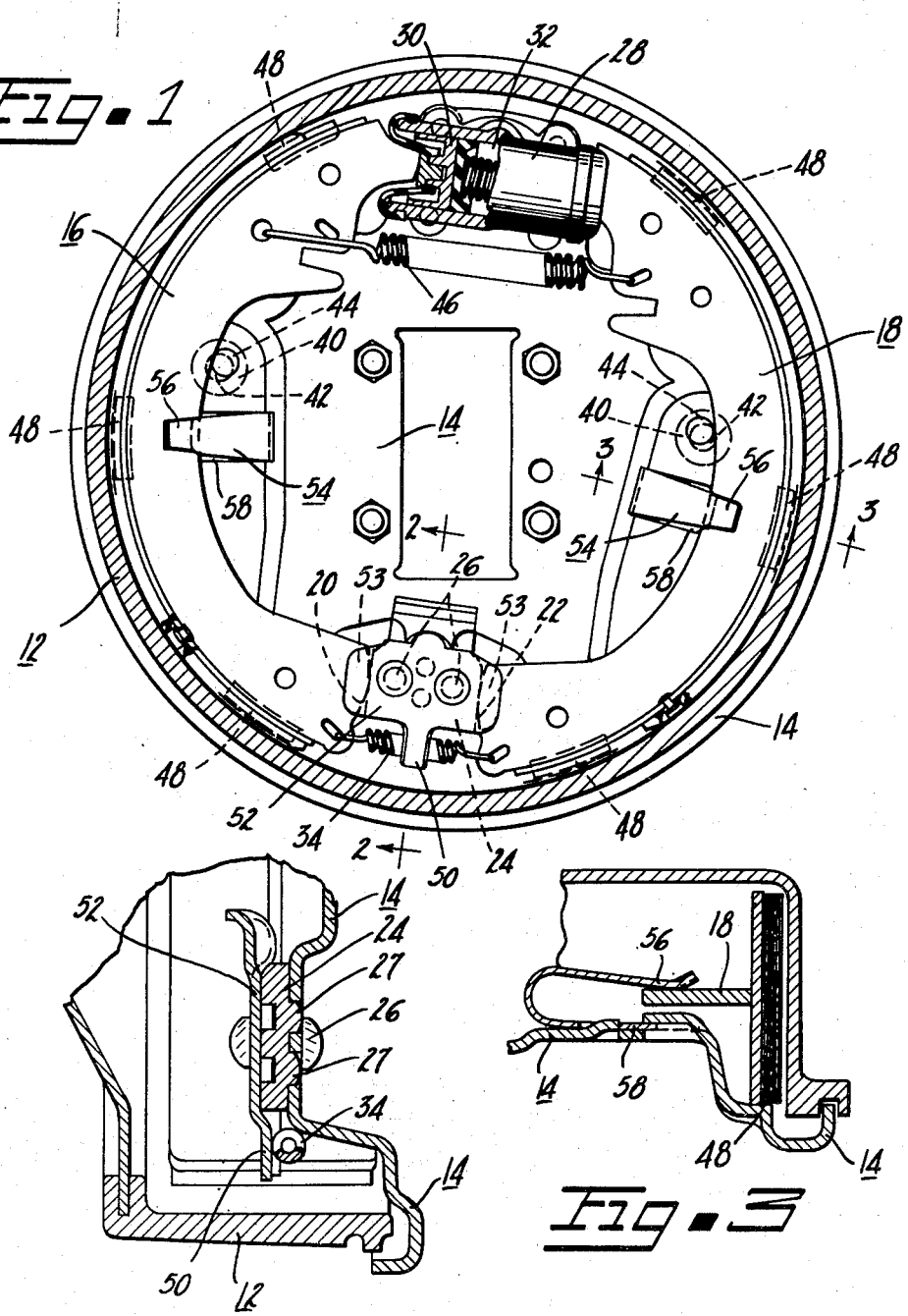

2,544,030

UNITED STATES PATENT OFFICE 2,544,030

INTERNAL-EXPANDING SHOE BRAKE

Bryan E. House, South Bend, Ind., assignor to Bendix Aviation Corporation, South Bend, Ind., a corporation of Delaware Application February 7, 1947, Serial No. 727,245

8 Claims. (Cl. 188—78)

This invention relates to brakes, and more particularly to internal-expanding-shoe brakes wherein two shoes are provided which are permanently anchored at the same side of the brake and which are moved into engagement with the brake drum by spreading the unanchored ends of the shoes, this brake arrangement being commonly referred to as a "non-servo" brake.

In my application Serial No. 518,940, filed January 20, 1944, Patent No. 2,509,643, May 30, 1950, I disclosed a "non-servo" brake in which the shoes, instead of being anchored on the conventional pivot pins, are capable of sliding movement along the sides of a flat-sided anchor member. Furthermore, in the "non-servo" brake disclosed in my earlier application, the shoe-positioning spring which is adjacent the anchored ends of the shoes is laterally deflected to provide a lateral component which holds the shoes against the supporting member, or backing plate.

The purpose of the present invention is to improve the "non-servo" brake disclosed in my previous application by eliminating any tendency to develop objectionable noise, or "squeal." In this connection I have discovered that a material and unexpected advantage is gained by shifting the spring which is adjacent the anchor to a position between the anchor and the adjacent surface of the brake drum. The spring is thus connected to the shoes at their extreme lower ends. Such an arrangement, taken in conjunction with hold-down springs located near the centers of the respective shoes, provides a brake which is relatively quiet in operation.

The manner of attainment of the desired result is explained by referring to an illustrative embodiment of the invention, reference being had in the description to the accompanying drawing, in which:

Figure 1 is a side elevation showing a brake assembly which incorporates my invention, the braking flange of the brake drum being shown in section; and Figures 2 and 3 are partial sections taken on the lines 2—2 and 3—3, respectively, of Figure 1.

The illustrated brake comprises generally a rotatable drum having a cylindrical braking flange 12, a nonrotatable support member, or backing plate, 14 mounted on a rigid part of the vehicle, and two arcuate lined brake shoes 16 and 18 mounted in end-to-end relationship on the support member 14 and adapted to be expanded into engagement with the drum 12 in order to impede the rotation thereof, each of said brake shoes being substantially T-shaped in cross-section, the stem of the T being provided by the shoe web, and the head of the T being provided by the lined shoe rim.

The lower ends 20 and 22 of the shoes 16 and 18, respectively, are maintained in contact with the opposite sides of an anchor 24, which is fixed to the support member 14, as shown in Figure 2. The particular form of the anchor 24 is not material, except that its conformation must be such as to permit the ends of the shoes to slide radially along its sides to assume the proper position with respect to the brake drum 12, particularly after adjustment. Furthermore, it is immaterial whether the anchor 24 be made integral with the backing plate or be fixed thereto. In the present case, the anchor is riveted to the backing plate by rivets 26, and additional support is provided by projections 27 on the anchor which extend into openings in the backing plate. In the specification and claims, it is intended that the use of the term "anchor" refer to any element or elements having singly or collectively the functions of the single anchor 24. Thus, two adjacent anchors might be provided, one for each shoe, without going beyond the scope of the present invention.

The unanchored ends of the shoes are adapted to be spread apart into contact with the drum by means of a hydraulic actuator 28, which is mounted on support member 14, and which is provided with a pair of pistons 30. The pistons 30 are in engagement with the ends of the shoes and are urged apart by admission of hydraulic fluid under pressure to chamber 32 between the pistons.

Resilient means are provided for maintaining the lower ends of the shoes at all times in engagement with the anchor 24. For this purpose, a spring 34 is used, which is located between the anchor 24 and the adjacent surface of the drum 12, and which is connected to the shoes at their lowermost edges.

An adjustor 40 is provided for each of the shoes. The illustrated form of adjustor has a stem 42 extending through an opening in the backing plate, and an eccentric pin 44 which engages the web of the respective shoe. Rotating the shaft, or stem, of the adjustor causes the eccentric pin 44 to rotate about the axis of the shaft 42, thus varying the position of the shoe relative to the support member 14.

A return spring 46 is in tension between the shoes 16 and 18 near the upper ends thereof, the spring 46 being located between the adjustors and the upper ends of the shoes, whereas the spring 34 is located at the lowermost ends of the shoes. The arrangement of the springs 34 and 46 is such that the moment of the lower spring 34 about the adjustors is always greater than the moment of the upper spring 46 about the adjustors.

The shoes are maintained in the proper position laterally by engagement of the shoe rims with the backing plate 14. As seen in Figure 3, the rim of the shoe engages a ledge 48 formed on the stamped backing plate. Several of these ledges 48 are provided on the backing plate, as shown by dotted lines in Figure 1. In the preferred form of the invention each shoe is held against three ledges of the backing plate. One of these ledges is located adjacent the respective adjustor 40, a second is located adjacent the anchor 24, and the third is located near the actuator 28.

In order to hold the edges of the shoes against these ledges, means are provided for exerting a force on the shoes in the direction of the backing plate. As shown in Figure 2, the spring 34 is so arranged as to have a force component acting downwardly in the direction of the backing plate. This is accomplished by utilizing an extension 50 on the shoe-guiding plate 52 as a deflecting member which causes lateral deflection of the center portion of the spring 34. The shoe-guiding plate 52 is secured to the anchor 24 and has end portions 53 which overlie the anchored ends of the shoes to assist in guiding the same.

The shoes are additionally held in the proper lateral position by means of resilient hold-down members 54, which are located near the centers of the respective shoes, and which may consist of flat springs each having an arm 56 which engages the shoe web and a folded over arm 58 which is secured to the backing plate (see Figure 3).

It is preferred that the anchoring ends of the shoes be convexly curved in order to permit rocking of the shoes during the actuation thereof. As shown, the sides of the anchor are flat, whereas the ends of the shoe webs are slightly curved. This curvature of the shoe webs at their anchoring ends is such that the drum-contacting end portions of the shoes at the anchor move away from the drum as the upper ends of the shoes return to released position.

The arrangement of the present brake, wherein a spring is connected in tension between the lowermost ends of the shoes, has proved particularly desirable because it eliminates any tendency of the brake to "squeal." Presumably this advantage is gained because the lateral force holding the shoes against the backing plate is exerted at a point close to one of the ledges 48. Since the laterally deflected spring 34 is a maximum distance from the center of the brake, it has been found desirable to provide additional hold-down means, such as the spring members 54.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in cooperation with a rotatable brake drum, a brake comprising a non-rotatable support member having anchor means provided thereon, two brake shoes each having one end thereof in contact with a surface of said anchor means, means for spreading the unanchored ends of the shoes to bring them into engagement with the drum, a spring which is located between the anchor means and the adjacent surfaces of the drum and which is connected in tension between the ends of the shoes to maintain them continuously in engagement with the respective surfaces of the anchor means, and means associated with said spring for causing the same to exert a lateral force component to hold the shoes against the support member and thereby determine their lateral position.

2. For use in cooperation with a rotatable brake drum, a brake comprising a non-rotatable support member having anchor means provided thereon, two brake shoes each having one end thereof in contact with a surface of said anchor means, means for spreading the unanchored ends of the shoes to bring them into engagement with the drum, a spring which is located between the anchor means and the adjacent surface of the drum and which is connected in tension between the ends of the shoes to maintain them continuously in engagement with the respective surfaces of the anchor means, means associated with said spring for causing the same to exert a lateral force component to hold the shoes against the support member and thereby determine their lateral position, and resilient hold-down devices acting on the respective shoes near the centers thereof to assist in holding the shoes against the support member.

3. For use in cooperation with a rotatable brake drum, a brake comprising a non-rotatable support member having anchor means provided thereon and having a plurality of ledges, two brake shoes each having one end thereof in contact with a surface of said anchor means, means for spreading the unanchored ends of the shoes to bring them into engagement with the drum, a spring which is located between the anchor means and the adjacent surface of the drum and which is connected in tension between the ends of the shoes to maintain them continuously in engagement with the respective surfaces of the anchor means, and a spring-deflecting projection which causes the spring to exert a lateral force component to hold the shoes against the ledges of the support member and thereby determine their lateral position.

4. For use in cooperation with a rotatable brake drum, a brake comprising a non-rotatable support member having anchor means provided thereon and having a plurality of ledges, two brake shoes each having one end thereof in contact with a surface of said anchor means, means for spreading the unanchored ends of the shoes to bring them into engagement with the drum, a spring which is located between the anchor means and the adjacent surface of the drum and which is connected in tension between the ends of the shoes to maintain them continuously in engagement with the respective surfaces of the anchor means, a projection carried by the anchor means engageable with the mid-portion of said spring for causing the same to exert a lateral force component to hold the shoes against the ledges of the support member and thereby determine their lateral position, and resilient hold-down devices acting on the respective shoes near the centers thereof to assist in holding the shoes against said ledges.

5. A brake comprising two shoes arranged in end-to-end relation, a backing plate which supports the shoes, an anchor member secured to the backing plate having its sides in contact with the ends of the shoes to receive the anchoring torque thereof, a guide member associated with said anchoring member having end portions which overlie the anchored ends of the shoes to retain said shoes in proper lateral position and having a projection extending radially outwardly, and a spring connected in tension between the ends of the shoes, said spring being located radially outwardly beyond the anchor member and being centrally deflected by the projection of said guide member to develop a lateral force component urging the shoes toward the backing plate.

6. A brake comprising two shoes arranged in end-to-end relation, a backing plate which supports the shoes, a combined anchor and guide member secured to the backing plate having surfaces which engage the ends of the shoes to receive the anchoring torque thereof, said member having end portions which overlie the anchored ends of the shoes to retain said shoes in proper lateral position and having a projection extending radially outwardly, and a spring connected in tension between the ends of the shoes, said spring being located radially outwardly beyond said member and being centrally deflected by the projection of said member to develop a lateral force component urging the shoes toward the backing plate.

7. For use in cooperation with a rotatable brake drum, a brake comprising a non-rotatable support member located in a substantially vertical plane and having an anchor thereon near the bottom thereof, two arcuate substantially semi-circular brake shoes each having the lower end thereof in contact with the anchor, the anchored ends of the shoes being capable of sliding movement along the sides of the anchor, and adjustor for each shoe which is operatively associated with the shoe at a point remote from the anchor, two springs, each connected to both shoes and in tension therebetween, one being located above the adjustors, and the other being located below the anchor, the arrangement being such that the moment of the lower spring about the adjustors is greater than that of the upper spring, and an extension on said anchor engaging the center portion of one of said springs to derive a lateral force component urging the shoes into engagement with the support member.

8. For use in cooperation with a rotatable brake drum, a brake comprising a non-rotatable support member located in a substantially vertical plane and having an anchor thereon near the bottom thereof, two arcuate substantially semi-circular brake shoes each having the lower end thereof in contact with the anchor, the anchored ends of the shoes being capable of sliding movement along the sides of the anchor, an adjustor for each shoe which is operatively associated with the shoe at a point remote from the anchor, and two springs, each connected to both shoes and in tension therebetween, one being located above the adjustors, and the other being located below the anchor, the arrangement being such that the moment of the lower spring about the adjustors is greater than that of the upper spring, said support member being provided with a plurality of shoe-positioning ledges, and a spring-deflecting member carried by said support member engaging the center portion of the lower spring in such a manner to produce a lateral force component urging the shoes into engagement with said ledges.

BRYAN E. HOUSE.

REFERENCES CITED

The following references are of record in the file of this patent:

UNITED STATES PATENTS

| Number | Name | Date |
|---|---|---|
| 1,851,737 | Stoner | Mar. 29, 1932 |
| 1,933,079 | Sneed | Oct. 31, 1933 |
| 2,005,855 | Dick et al. | June 25, 1935 |
| 2,190,978 | Dick | Feb. 20, 1940 |
| 2,211,439 | Schnell | Aug. 13, 1940 |
| 2,337,070 | Alden et al. | Dec. 21, 1943 |
| 2,418,848 | Perrot | Apr. 15, 1947 |
| 2,423,015 | Goepfrich et al. | June 24, 1947 |
| 2,426,135 | Yost | Aug. 19, 1947 |

Certificate of Correction

Patent No. 2,544,030                                        March 6, 1951

BRYAN E. HOUSE

It is hereby certified that error appears in the printed specification of the above numbered patent requiring correction as follows:

Column 5, line 40, for "and" read *an*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*